3,321,326
TETRAGONAL SILICON AND GERMANIUM DISULFIDES AND THEIR PREPARATION
Howard Sargent Young, Chadds Ford, Pa., assignor to E. I. du Pont de Nemours and Company, Wilmington, Del., a corporation of Delaware
No Drawing. Filed Aug. 20, 1964, Ser. No. 391,043
11 Claims. (Cl. 106—288)

This invention relates to new crystal forms of inorganic chemical compounds and is more particularly concerned with tetragonal silicon disulfide, tetragonal germanium disulfide, and their synthesis from the elements under high pressures and temperatures.

These new tetragonal crystal structures of previously described compositions of matter are characterized by higher densities, higher indices of refraction, and, in the case of silicon disulfide, new levels of hydrolytic stability. As known today, high pressure is a requirement for the appearance of these tetragonal structures when the elements silicon, germanium, and sulfur are heated to reaction temperatures. No reference to their existence has been found in the literature.

Silicon disulfide, previously known, can be prepared directly from the elements (A. Zintle and K. Loosen; Z. Physik Chem. A174, 301 (1935)) or by the reaction of $SiO_2$ with $Al_2S_3$ at 1200–1300° C. (E. Tiede and M. Thiemann; Ber. dtsch. Chem. Ges. 59, 1703 (1926).) Although stable in dry air, it is hydrolyzed immediately by cold water to $H_2S$ and $SiO_2$. This hydrolytic instability has been observed many times when experiments involved reaction of the elements at pressures below the synthesis range for the tetragonal form.

Structural data for silicon disulfide given in "Crystal Data," Donnay (A.C.A. Monograph No. 5 (1963)), on page 382 include orthorhombic unit cell, $a=5.60$ A., $b=9.55$ A., $c=5.53$ A., $Z=4$; space group Ibam. Density is 2.06 (calc.) and 2.02 measured. The structure is described as an assemblage of $SiS_2$ chains with each sulfur atom joined to two silicon atoms. There is no bonding between the parallel chains and each of the individual units can be regarded as a molecule of infinite length.

The previously described germanium disulfide has been reported by W. Pugh (J. Chem. Soc. 1930, 2369), who prepared it by reacting germanium dioxide with sulfur vapor at around 850° C. Synthesis was also effected (1) by reacting $GeO_2$ with $H_2S$ and $H_2S$ plus sulfur vapor and (2) subliming GeS with sulfur vapor.

Structural data for germanium disulfide given in Donnay (p. 365) include orthorhombic unit cell, $a=11.66$ A., $b=22.34$ A., $c=6.86$ A., $Z=24$, space group $Fdd_2$. The density is 3.03 (calc.) and 3.01 measured. Zachariasen reported on the crystal structure (J. Chem. Phys. 4, 618 (1936)) and described the structure as a three-dimensional network of $GeS_4$ tetrahedra.

Structural information for the new tetragonal forms of $SiS_2$ and $GeS_2$ has been established from single crystal X-ray studies and powder data. This information is summarized below.

Tetragonal system:
Space group $I\bar{4}2d$—$Z=4$ for $SiS_2$ $a=5.43$ A., $c=8.69$ A., density (calc.)=2.39, density (measured)=2.37.
For $GeS_2$ $a=5.51$ A., $c=9.32$ A., density (calc.)=3.21.

The average (overall) indices of refraction for the two compounds are 2.28 for tetragonal $SiS_2$ and 2.40 for tetragonal $GeS_2$.

Powder patterns agree well with patterns calculated from single crystal data. The tabulation of eight strong lines below can be considered characteristic of the structures.

| Index | SiS$_2$ | | | GeS$_2$ | | |
|---|---|---|---|---|---|---|
| | Calc., A. | Observed Spacing, A. | Inten. | Calc., A. | Observed Spacing, A. | Inten. |
| 101 | 4.60 | 4.61 | $M_1$ | 4.74 | 4.72 | S |
| 112 | 2.88 | 2.97 | S | 2.99 | 2.96 | S |
| 220 | 1.92 | 1.92 | $M_3$ | 1.95 | 1.94 | $M_2$ |
| 204 | 1.70 | 1.70 | $M_2$ | 1.78 | 1.79 | $M_3$ |
| 411, 141 | 1.30 | 1.30 | $M_1$ | 1.33 | 1.32 | $M_3$ |
| 305, 035 | 1.25 | 1.26 | F | 1.31 | 1.29 | $M_3$ |
| 403 | 1.23 | 1.23 | $M_3$ | 1.26 | 1.26 | $M_3$ |
| 240, 420 | 1.21 | 1.21 | F | 1.23 | 1.24 | $M_3$ |

These tetragonal silicon disulfide and germanium disulfide structures are isotypic. One product, a single phase (see Example 9), was synthesized from a charge containing silicon, germanium, and sulfur which gave an X-ray powder pattern having spacings intermediate to the ones listed above. These data present evidence of the formation of solid solutions having the tetragonal structure, presumably over the full composition range.

Thus, the vast differences in properties between the known orthorhombic forms of silicon disulfide and germanium disulfide and the new tetragonal forms of these two compounds are easily seen. A comparison of densities, for example, shows measured values of 2.37 for tetragonal silicon disulfide and 2.02 for the orthorhombic form. Likewise, tetragonal germanium disulfide has a calculated density of 3.21, while the orthorhombic form has only a calculated value of 3.03, and a measured density of 3.01. Such widespread improvements on properties for the tetragonal forms give rise to an important pigmentary utilization, as will be hereinafter exemplified.

The new tetragonal forms of silicon disulfide and germanium disulfide are prepared, as noted above, by synthesis from the elements silicon, germanium, and sulfur under high pressures and temperatures.

Most synthesis of both $SiS_2$ and $GeS_2$ in the experiments which formed the basis for the following examples have been run with a cold pressure of 60–65 kilobars, which represents the preferred embodiment. At this initial pressure the silicon/sulfur reaction proceeds rapidly, as displayed by a temperature flash at around 850–900° C. The final temperature has been held at 900–1350° C., and the product can be slow cooled or quenched at pressure. In case of quenching, the power is cut from the small heater, and the temperature probably drops to a few hundred degrees in well under a minute. The germanium/sulfur reaction proceeds more slowly (flash usually not observed) and has been run at 900–1100° C. followed by either slow cooling or a quench.

As regards pressures lower than the preferred embodiment of 60–65 kilobars, the germanium disulfide synthesis has been run at pressures as low as 30 kb. Efforts at running at pressures as low as 15 kb. have been unsatisfactory. The silicon disulfide does not form at 30 kb. and 800° C., but can be made at 42 kb. and 800° C.

The lower pressure for the tetragonal $GeS_2$ is probably around 20 kb. The comparable value for $SiS_2$ is possibly as low as 35 kb. In both cases, the pressure figures for synthesis from the elements are probably higher than the true equilibrium values. Also, it must be recognized that pressure values are not independent of temperature.

Basic compositional data for the new tetragonal disulfides are derived from the single crystal analysis coupled with density determination, noted above. The structure is probably non-stoichiometric—which is equivalent to saying it probably can exist as a solid solution, certainly with excess sulfur. A sample of tetragonal silicon disulfide, from a synthesis charging silicon/sulfur in the atom ratio of 1:2.2 in a boron nitride (BN) crucible, was checked for Fe, Mg, Cu, Al, B, Ca, and Na by emission spectroscopy. There is every indication from this that the major constituents of the tetragonal silicon disulfide synthesized in BN are silicon and sulfur.

With regard to thermal stability of the new tetragonal disulfides, samples of $SiS_2$ have been heated to 400° C. without any apparent transformation, and a few crystals were heated under argon flow (hot stage microscope) to 1060° C. In the latter experiment, there was a slight loss in transparency at around 488° C., but beyond this, the morphology remained the same. Effects at synthesis at low pressures indicate that there may be other unknown forms of silicon disulfide besides the orthorhombic form known in the prior art and the new tetragonal form. Accordingly, more work in closed systems (to avoid oxidation reactions) would be necessary before an upper stability temperature could be established. This incidentally, would only have real meaning if measured at the developed vapor pressure.

In conducting the experiments which form the bases of the eleven specific examples, the following equipment and experimental procedures have been utilized.

Basic elements of the kind of equipment employed are described by H. Tracy Hall in Rev. Sci. Instr., 29, 267 (1958). In general terms, it is known as the tetrahedral-anvil apparatus. Pressure data given by Hall are in accordance with a scale now recognized as incorrect.

Our specific embodiment of the tetrahedral anvil principle was first described in a paper by E. C. Lloyd, U. O. Hutton, and D. P. Johnson, J. Research, Nat. Bur. Standards, 63C, 59 (1959). It differs from the Hall apparatus, which employed four rams, in having the motion of three anvils provided through the wedge action of a ring with a conical hole. The N.B.S. publication also uses data from the incorrect pressure scale.

Our equipment includes a 500-ton hydraulic press, and a support ring large enough to handle an anvil with a triangular face, one inch on edge. In this apparatus, all experiments were run in an assembly built into a tetrahedron of pyrophyllite 1.25 in. on edge. The elements of an experimental assembly are illustrated in FIG. 8 of Hall's paper (p. 272).

For a chemical experiment, the cavity through the tetrahedron is fitted with a platinum or graphite heater tube into which a crucible container is inserted. Electrical contact is improved by providing a thin metal cover, usually platinum, between the ends of the heater tube and the metal tabs contacting the anvils. More specific data are given in the experimental examples.

Since the essence of the invention consists in the synthesis of tetragonal disulfide from the elements silicon, germanium, and sulfur at high pressures, it is worthwhile to describe the manner in which the pressure scale for the high pressures utilized in the experiments was established.

The basic problem for the establishment of a pressure scale is to correlate some intensive variable measured in the machine developing the pressure with one or more fixed points or calibration points. The most extensively employed physical effect as a function of pressure is that of electrical resistivity. A change in this property for a calibrating substance usually accompanies a first order structural change initiated by pressure.

Our experimental tetrahedral anvil facility was calibrated using Bi, Ti, and Ba as the calibrating materials at room temperature. In all cases, AgCl was the surrounding medium for the wire and the combination was inserted in the 1.25 in. edge tetrahedron.

The most recent values for the fixed points that justify ready acceptance appear in the 1963 edition of the American Institute of Physics Handbook, p. 443. These are tabulated below (all values for ambient temperature).

Bismuth I→II—25.37±.02 kb.
Bismuth II→III—26.96±0.18 kb.
Thallium II→III—36.69±0.11 kb.
Barium II→III—59.0±1.0 kb.

All compressions in the following examples were made on the cold assembly and charges were heated to the temperature indicated by the appropriate thermocouple. Press loads are given as a single value and the most probable pressure given as a range. The pressure unit is a bar, equivalent to $10^6$ dynes/cm.$^2$. The larger unit, a kilobar, is consistently shown. No pressure correction for thermocouple behavior has been introduced; standard E.M.F. tables for 1 atm. being employed. Additional details appear in the following examples, which illustrate specific embodiments of this invention.

*Example 1*

An aluminum oxide crucible 0.155 in. outside diameter by 0.462 in. long (cavity=0.108 in. by 0.350 in. deep) was filled with 0.024 g. of crystalline silicon in the form of grains imbedded in 0.066 g. of sulfur. The atom ratio of the charge was approximately 1:2.5. The sulfur was added as powder and melted to achieve maximum density by heating to around 125–150° C. An aluminum oxide cover was fitted to the crucible and the combination inserted into a close fitting tubular heater of platinum. This assembly was, in turn, fitted into the cavity of a 1¼ in. edged tetrahedron fabricated out of pyrophyllite. Metal tabs were provided to effect electrical contacts external to the tetrahedron. A thermocouple of Pt/6% Rh-Pt/30% Rh was assembled with the junction situated immediately next to the center of the platinum heater measured along the length. Thermocouple leads were led through edges of the tetrahedron.

The assembled tetrahedron was situated in a tetrahedral anvvil press and loaded cold to 350 tons, equivalent to an internal sample pressure of 60–65 kilobars. Heat was then applied over about 50 minutes to reach 800° C., and a temperature of 800–830° C. was maintained for one hour. Subsequently over a period of 40 minutes the temperature was increased to 1350° C. and the reaction quenched.

Subsequent examination of the product indicated that the $Al_2O_3$ crucible had been attacked by sulfur. The major portion of the silicon also had reacted, and crystalline material was recovered from a center core, which on examination by X-ray diffraction, proved to be a new form of $SiS_2$ with the tetragonal structure.

*Example 2*

The type of experimental in Example 1 was run in a crucible and cover fabricated from boron nitride. The internal cavity size was 0.120 in. diameter by 0.353 in. deep. To this was charged 0.024 g. silicon fragments imbedded in 0.086 g. sulfur. An identical platinum heater and thermocouple were provided and a 1¼ in. tetrahedron assembled as in Example 1 in a tetrahedral anvil press.

The initial cold pressure was 60–65 kilobars (350 tons press load), and the reaction was heated to 800° C. in 16 min. and held at this temperature for 1 hr. Subsequently, the temperature was increased to 1300° C. and held there for about 80 min. before quenching.

Examination of the product indicated negligible involvement of the boron nitride crucible, some unreacted silicon and sulfur, and a transparent birefringent crystalline phase of high index of refraction (greater than 1.65). Separation of this phase and examination by X-ray diffraction disclosed the tetragonal form of $SiS_2$.

Example 3

An intimate mixture of transistor grade silicon and pure sulfur (American Smelting and Refining Spectroscopic Grade, 99.999%) was prepared in the silicon/sulfur atom ratio of 1:2.0. An aliquot part, 0.135 g., was compacted at 60 tons per sq. in. in a die to form a cylindrical charge inserted into a 0.120 in. diameter boron nitride crucible. This crucible plus a boron nitride cover was surrounded by a close fitting graphite heater and fitted along with a thermocouple into a 1¼ in. tetrahedron.

A cold pressure of 60–65 kilobars was applied (350 tons), and the system heated. After approximately 12 minutes, when a temperature of around 850° C. was attained, a rapid reaction was noted by a flash temperature rise. Heating was continued to 1200° C. and the temperature was maintained at 1150–1200° C. for 3 hr. before quench cooling.

A significant portion of the yellowish crystalline product was extracted with $CS_2$ with little indication of free sulfur. Examination by X-ray diffraction disclosed a strong pattern which corresponded to the tetragonal form of $SiS_2$. A portion of the crystalline product was observed to be hydrolytically stable and essentially unreactive at room temperature toward cold concentrated hydrochloric acid.

Example 4

An aliquot of the same mixture of silicon/sulfur employed in Example 3 was handled similarly and assembled identically in a 1¼ in. tetrahedron. Following the cold pressuring to 60–65 kilobars, the temperature was increased over 40 min. to around 890° C., where the exothermic reaction was observed. The temperature was maintained at 890–900° C. for three hours and the system quenched. After separation from the BN (boron nitride) crucible and examination by X-ray diffraction, essentially all of the product was found to be tetragonal $SiS_2$.

Example 5

An intimate mixture of elemental germanium (99.94% Eagle Pitcher, 1st Reduction Grade) and spectroscopic pure sulfur was prepared in the atom ratio of 1:2.0. An aliquot part, 0.189 g., was compacted at 40 tons per sq. in. to form a cylindrical charge for the same size of BN crucible as in Example 3. Assembly into a tetrahedron followed the procedures previously described.

After pressuring cold to 60–65 kilobars, the reaction mixture was heated to 900° C. over a 20 min. period and held essentially constant at this temperature for 3 hr. This product was also quenched. Examination after removal from the BN container indicated crystalline material, birefringent with an index of refraction above 1.69. X-ray examination showed a tetragonal structure isotypic with that of tetragonal $SiS_2$.

Example 6

An aliquot of an intimate mixture of silicon (transistor grade) and sulfur (99.999%) in the atom ratio of 1:2.0 was handled the same in all aspects as in Examples 3 and 4. The assembled tetrahedron was pressured cold to 60–65 kilobars and heated to 1300° C. over approximately 1 hr. The exothermic reaction was observed at around 890° C. After 2 hr. at 1300° C., the reaction was cooled slowly (150° C. hr.) to 600° C. and quenched from this temperature.

The ends of the product ingot comprised crystals large enough for a single crystal analysis which, when completed, established the tetragonal system with a unit cell, $a=5.43$ A., $c=8.69$ A., $Z=4$, calculated density for $SiS_2=2.39$. Space group $I\bar{4}2d$. Crystals from this same product had a measured density of 2.37.

Example 7

A synthesis following the same general procedure of Example 3 was carried out using a charge of silicon and sulfur in the atom ratio of 1:1.0. Heating, after cold pressuring to 60–65 kilobars, to 900° C. resulted in an exothermic reaction. The mixture was then held at 1000° C. for 3 hr. and quenched. Examination of the product disclosed unreacted silicon plus a crystalline product. The latter, in accordance with X-ray diffraction data, was the tetragonal $SiS_2$.

Example 8

An aliquot of the mixture used in Example 5 (Ge/S=1:2.0) was handled identically in a BN crucible. Heating at 60–65 kb. was effected over 30 min. to 1100° C. The reaction was maintained at 1100–1105° C. for 3 hr. and quenched.

The crystalline product was identified by X-ray diffraction as the tetragonal form of $GeS_2$. A single crystal from this product served to establish by X-ray diffraction that the structure was isotypic with $SiS_2$, belonging to the tetragonal system with a unit cell, $a=5.51$ A., $c=9.32$ A., $Z=4$. Calculated density for $GeS_2=3.21$. Space group $I\bar{4}2d$.

Example 9

An aliquot (0.169 g.) of a mixture containing transistor grade silicon, purified germanium (99.9+%) and spectroscopically pure sulfur, prepared in the silicon/germanium/sulfur atom ratio of 0.5:0.5:2.0, was compacted into a cylindrical charge for a BN crucible. (See Example 3.) Loaded into a 1¼ in. tetrahedron, the charge was cold pressured to 60–65 kb. and heated over about 15 min. to 1300° C. An exothermic reaction at 870° C. was observed. After being held at 1300° C. for 2 hr., the reaction mixture was quenched.

Examined optically, the product was homogeneous and displayed a crystalline birefringent phase. X-ray diffraction patterns, as powder diagrams, from two sections of the product revealed a tetragonal structure with line spacings intermediate to those for tetragonal $SiS_2$ and the larger cell of the isotypic $GeS_2$. The finding of a pattern for a single phase was indicative of a solid solution.

Example 10

An aliquot (0.202 g.) of a mixture containing purified germanium and spectroscopically pure sulfur prepared in the germanium/sulfur atom ratio of 1:2.05, was compacted into a cylindrical charge for a BN crucible (see Example 3). Loaded into a 1¼ in. tetrahedron, the charge was cold pressured to about 30 kilobars (102 tons press load) and heated over 25 min., to 900° C. A slight exothermic reaction was observed at around 775° C. The system was held at 900° C. and quenched.

Examination of this product indicated a homogeneous birefringent crystalline phase, which from X-ray powder data proved to be the tetragonal form of $GeS_2$.

Example 11

An aliquot (0.085 g.) of a mixture of transistor grade silicon and spectroscopically pure sulfur, prepared in the silicon-sulfur atom ratio of 1:2.0, was compacted at 60 tons per sq. in. to form a cylindrical charge for a BN crucible 0.120 in. I.D. x 0.217 in. long. This small crucible with a BN cover was centered in the usual graphite heater and assembled in a 1¼ in. tetrahedron.

The cold pressure was limited to 40–42 kb. (170 tons press load) and the heating limited to 800° C. After 5 hr. at temperature, the system was quenched. Examination of the product optically and by X-ray diffraction, disclosed unreacted sulfur and silicon plus a significant proportion of tetragonal $SiS_2$.

The high indices of refraction and reasonable chemical stability for both $SiS_2$ and $GeS_2$ in the tetragonal structure suggest a pigmentary application. This utilization was reduced to practice on a small scale with a sample of clear varnish vehicle. A small portion of tetragonal silicon disulfide was handground in the varnish vehicle and applied to a Morest Co. test chart. The resulting color was an olive grey, and hiding power was displayed.

Thus, the tetragonal silicon disulfide, and the equivalent tetragonal germanium sulfide possess a practical utility as pigments. This utility is due to the improved properties of the tetragonal structures, as contrasted with the properties of the prior art orthorhombic forms. By way of example, the hydrolytically unstable orthorhombic $SiS_2$ of the prior art readily reacts with water vapor at normal atmospheric humidity. One of the reaction products, hydrogen disulfide, is not only objectionable from the viewpoint of odor but also is more toxic at low concentration than carbon monoxide. Thus, from a practical viewpoint, a material such as orthorhombic $SiS_2$ that releases $H_2S$ on exposure to atmospheric moisture has little or no pigmentary utility, in direct contrast to the tetragonal structures of the present invention.

As previously noted, these new tetragonal forms are characterized by higher densities, higher indices of refraction, and higher levels of hydrolytic stability than the previously known orthorhombic forms. Likewise, the formation of the tetragonal structures, with their improved properties that lead to practical utilization as pigments, is the unexpected and unobvious result of synthesis of the disulfides from the elements at high pressures.

As many apparently widely different embodiments of this invention may be made without departing from the spirit and scope thereof, it is to be understood that this invention is not limited to the specific embodiments thereof.

The embodiments of the invention in which an exclusive property or privilege is claimed are defined as follows:

1. A composition of matter selected from the class consisting of tetragonal silicon disulfide, tetragonal germanium disulfide, and a tetragonal solid solution of silicon disulfide and germanium disulfide.
2. Tetragonal silicon disulfide with a unit cell, $a=5.43$ A., $c=8.69$ A., $Z=4$, space group $I\overline{4}2d$.
3. Tetragonal germanium disulfide with a unit cell, $a=5.51$ A., $c=9.32$ A., $Z=4$, space group $I\overline{4}2d$.
4. A tetragonal solid solution for silicon disulfide and germanium disulfide.
5. Process for preparing a composition of claim 1 which comprises subjecting a mixture of (1) elemental sulfur and (2) a composition selected from the class consisting of (a) elemental silicon, (b) elemental germanium, and (c) a mixture of elemental silicon and elemental germanium, to a pressure of at least 35 kilobars and a temperature of at least 800° C., and at an atom ratio of ingredient (1) to ingredient (2) of least 1 to 1.
6. The process of claim 5 wherein the atom ratio is between 1 to 1 and 1 to 2.5.
7. The process of claim 6 wherein ingredient (2) is elemental silicon.
8. The process of claim 6 wherein the pressure is 60–65 kilobars.
9. The process of claim 7 wherein the pressure is 60–65 kilobars.
10. Process for preparing tetragonal germanium disulfide which comprises subjecting a mixture of (1) elemental sulfur and (2) elemental germanium to a pressure of at least 20 kilobars and a temperature of at least 900° C., and at an atom ratio of ingredient (1) to ingredient (2) of between 1 to 1 and 1 to 2.5.
11. The process of claim 10 wherein the pressure is at least 30 kilobars.

References Cited by the Examiner
UNITED STATES PATENTS

| | | | |
|---|---|---|---|
| 2,589,653 | 3/1952 | Alvarez-Tostado et al. | 23—206 |
| 2,766,103 | 10/1956 | Nielsen et al. | 23—206 |

TOBIAS E. LEVOW, *Primary Examiner.*

HELEN M. McCARTHY, *Examiner.*

J. E. POER, *Assistant Examiner.*

UNITED STATES PATENT OFFICE
CERTIFICATE OF CORRECTION

Patent No. 3,321,326　　　　　　　　　　　　　　　May 23, 1967

Howard Sargent Young

It is hereby certified that error appears in the above numbered patent requiring correction and that the said Letters Patent should read as corrected below.

Column 4, line 14, for "Ti" read -- T1 --; column 8, line 11, for "for" read -- of --.

Signed and sealed this 29th day of October 1968.

(SEAL)
Attest:

Edward M. Fletcher, Jr.　　　　　　　　　　　　EDWARD J. BRENNER
Attesting Officer　　　　　　　　　　　　　　　　Commissioner of Patents